(12) United States Patent
Teichmann

(10) Patent No.: US 6,205,040 B1
(45) Date of Patent: Mar. 20, 2001

(54) AUXILIARY RESONANT COMMUTATED POLE THREE-POINT OR MULTIPOINT CONVERTER

(75) Inventor: Ralph Teichmann, Dresden (DE)

(73) Assignee: ABB Patent GmbH, Mannheim (DE)

( * ) Notice: Subject to any disclaimer, the term of this patent is extended or adjusted under 35 U.S.C. 154(b) by 0 days.

(21) Appl. No.: 09/553,323

(22) Filed: Apr. 20, 2000

(30) Foreign Application Priority Data

Apr. 20, 1999 (DE) .............................................. 199 17 732
Sep. 23, 1999 (DE) .............................................. 199 45 864

(51) Int. Cl.[7] .......................... H02M 7/122; H02M 7/521
(52) U.S. Cl. ........................................... 363/57; 363/137
(58) Field of Search ................ 363/50, 55, 56.01–56.05, 363/57, 58, 96–98, 135–137

(56) References Cited

U.S. PATENT DOCUMENTS

| 4,151,586 | * | 4/1979 | Udvardi-Lakos | ....................... 363/57 |
| 4,535,378 | * | 8/1985 | Endo | ....................... 361/18 |
| 5,892,675 | * | 4/1999 | Yatsu et al. | ....................... 363/136 |

FOREIGN PATENT DOCUMENTS 60-213271 * 10/1985 (JP) .............................. H02M/7/515

* cited by examiner

*Primary Examiner*—Matthew Nguyen
(74) *Attorney, Agent, or Firm*—Herbert L. Lerner; Laurence A. Greenberg; Werner H. Stemer

(57) ABSTRACT

A three-point or multipoint converter is described. The converter has a series circuit formed of at least four main switches per converter phase, which are connected electrically in parallel between a positive and a negative DC voltage rail. An individual snubber capacitance is disposed in parallel with each individual main switch. At least two converter levels are formed between the DC voltage rails, a junction point or junction points and voltage neutral points of the converter levels are accessible. An output of the converter phase is connected to the voltage neutral points of the converter levels, via a series circuit formed of at least one resonant inductance and independently controllable bidirectional auxiliary switches. Junction points of the snubber capacitances that do not at the same time form the output of the converter phase are connected via charge control switches to the junction point or the junction points of the converter levels.

6 Claims, 7 Drawing Sheets

AUXILIARY RESONANT COMMUTATED POLE THREE-POINT OR MULTIPOINT CONVERTER

BACKGROUND OF THE INVENTION

Field of the Invention

The invention relates to an auxiliary resonant commutated pole (ARCP) three-point or multipoint converter and, in particular, to soft-switching multipoint converter topologies for high-power converters.

Hard-switching multipoint converters, as have been proposed, for example, by A. Nabae et al. in the publication "A New Neutral Point Clamped PWM Inverter", in "Transactions of the IEEE Industrial Applications Society", Vol. 1A-17, No. 5, 1981, are used in the high-power field for controlling three-phase drives and, in power transmission systems, for gateways and compensation. The multipoint converter concept has been proven, in particular at high voltage levels for which the maximum reverse voltage of an individual active semiconductor device that is now available is inadequate.

At present, GTO switches with inverse diodes are used in multipoint converters with a voltage intermediate circuit in the high power field. In this configuration, the maximum current gradients di/dt and the voltage gradients du/dt that occur have to be limited by passive limiter networks, in order to avoid destruction of the active semiconductor devices. Such networks often have high losses, and contribute significantly to converter complexity and converter costs.

The maximum achievable switching frequency in these high-power converters is limited by the switching losses that occur in the semiconductor and by the minimum switching and recovery times of the semiconductor components. Since the switching frequency has a direct influence on the quality of the electrical input and output variables, and thus on the overall system configuration, the achievable switching frequency is a major quality criterion for a converter.

Progress in power-semiconductor development is now allowing converters to be operated with a considerably greater di/dt and du/dt, and this has resulted in the limiter networks becoming considerably smaller, or even being dispensed with. The present achievable switching frequency is thus now governed essentially only by the maximum permissible semiconductor losses.

Various soft-switching converter topologies that allow the switching losses to be reduced have been proposed in order to increase the maximum switching frequency for converters in the low and medium power ranges. In particular, the "Auxiliary Resonant Commutated Pole" (ARCP) principle for two-point converters, proposed in U.S. Pat. No. 5,047,913 by R. De Doncker et. al, is highly suitable for reducing switching losses. In such an ARCP converter, a snubber capacitor is connected electrically in parallel with each main switch.

Furthermore, an auxiliary circuit is proposed, which contains an auxiliary switch that is electrically connected in series with a resonant inductance, and which connects the neutral point of a DC intermediate-circuit capacitor to one output connection of the converter phase.

In addition to the drastic reduction in switching losses, the ARCP principle also allows the maximum du/dt and di/dt to be controlled which, apart from the opportunity to use critical semiconductor switches, also results in a reduction in the load on the end turns in three-phase motors.

Possible ways to extend the ARCP principle to three-point converters with neutral point clamp (NPC) diodes have been proposed by Cho et al. at the IEEE PESC Conference 1996, German Patent DE 195 36 470 by Dr A. Mertens and M. Bruckmann and by D. G. Rouaud et. al. in U.S. Pat. No. 5,684,688. In these solutions, the converter output is once again connected to at least one resonant inductance, which may be connected independently, via at least two bi-directional switches, to the two voltage neutral points of the two converter levels in the three-point converter. The difference in the topologies is the way in which the snubber capacitances for the four main switches are disposed. The number and configuration of the snubber capacitances have been varied considerably in an attempt to solve the problem of asymmetric charging movement between the upper and the lower converter level during commutation. However, it has not yet been possible to find the ideal situation, which guarantees maximum main switch load relief and a uniform capacitor load, that is to say a parallel circuit containing exactly equal snubber capacitances as close as possible to the respective main switch.

SUMMARY OF THE INVENTION

It is accordingly an object of the invention to provide a auxiliary resonant commutated pole three-point or multipoint converter that overcomes the above-mentioned disadvantages of the prior art devices of this general type, in which a snubber network is the same for each main switch, and which can be disposed directly in parallel with each main switch.

With the foregoing and other objects in view there is provided, in accordance with the invention, a multipoint converter, containing:
- at least four main switches per converter phase disposed in series defining a first series circuit, the main switches are to be connected electrically in parallel between DC voltage rails formed of a positive DC voltage rail and a negative DC voltage rail;
- snubber capacitances, one of the snubber capacitances disposed in parallel with each of the main switches and the snubber capacitances define junction points between adjacent pairs of the snubber capacitances;
- at least two converter levels having voltage neutral points disposed between the DC voltage rails, a junction point formed between each adjacent pair of the converter levels and the voltage neutral points of the converter levels are accessible;
- a second series circuit formed of at least one resonant inductance and independently controllable bidirectional auxiliary switches;
- an output of the converter phase connected to the voltage neutral points of the converter levels via the second series circuit, the output is further connected to one of the junction points formed by the snubber capacitances; and
- charge control switches connected between the junction points of the snubber capacitances which are not connected to the output and the junction point formed between each adjacent pair of the converter levels.

The configuration for the three-point converter is obtained by the configuration of the plurality of converter phases. The converter phases are each connected electrically in parallel with a DC voltage intermediate circuit formed of a series circuit formed by two capacitors. The converter phases have an upper and a lower converter level each having two main switches, and whose junction points are each linked by a NPC diode to the junction point between the two capacitors in the DC voltage intermediate circuit.

Based on the hard-switching three-point converter topology with NPC diodes, the soft-switching ARCP three-point converter topology with charge control switches can be achieved by the below listed modifications and extensions.

a). In each converter level, a series circuit containing two capacitances or alternative voltage sources have to be provided in order to ensure that a voltage neutral point is available for that converter level.

b). The output of the converter phase must be connected through a series circuit containing a resonant inductance and independently controllable bidirectional auxiliary switches to the voltage neutral points in each converter level. In this case, one connection of one auxiliary switch is in each case connected to one voltage neutral point of one converter level, and one connection of the resonant inductance is connected to the output of the converter phase.

c). A snubber capacitance must be fitted in parallel with each main switch.

d). A controllable auxiliary switch must be connected back-to-back with each NPC diode.

A low-loss ARCP converter with charge control switches is thus obtained, which combines the advantages of a three-point converter or multipoint converter with those of an ARCP converter and in which it is possible to achieve maximum switching load relief. Control of the charge of the snubber capacitances via the main switches is achieved by additional charge control switches, which are connected back-to-back with the NPC diodes of the three-point converter.

With this topology, the switching instant of the main switches for the converter phase can be selected freely, as a result of which it is possible to use conventional pulse-width modulation methods. The main switches and the auxiliary switches connected back-to-back with the NPC diodes—the charge control switches—in this ARCP converter phase switch on and off when the voltage across these components disappears (zero voltage switching (ZVS) principle). The auxiliary switches in series with the resonant inductance are likewise operated using the zero current switching (ZCS) principle in order to relieve switching modes. In the ZCS principle, the auxiliary switches are switched on and off when the current disappears. Therefore, all the semiconductor switches used in the converter phase switch with low losses. The voltage aspects of the configuration of the main switches, auxiliary switches and charge control switches, as well as the method of operation of the switches, can be seen in Table 1, below, referring to the drawing in order to explain the reference symbols used. The configuration of the rated current aspects of the switches depends on the circuit parameters which determine the root-mean square current through the switches, and the thermal and electrical characteristics of the switches. The advantages of ARCP three-point converter topology with charge control switches over the previously proposed ARCP three-point converters are:

a) uniform current load on the snubber capacitances, b) minimized stray inductances and optimal load relief for the main switches associated with this, c) minimized parasitic oscillations after commutation, d) the opportunity to share the high losses of the semiconductors in the neutral path, when the output voltages are low and the output current is high, by the doubling of the number of semiconductors which can be achieved by paralleling the neutral paths, e) configuration of the NPC diode and the back-to-back switch in a standard module, and f) manufacturing cost advantages which can be achieved by the commonality of all the main switch modules that are subject to load relief.

TABLE 1

| Switch Configuration | | |
|---|---|---|
| | Type | Maximum voltage load |
| Main switches ($S_1$, $S_2$, $S_3$, $S_4$) | ZVS | $V_{dc}/2$ |
| Charge control switches ($S_{p\text{-}NPC}$, $S_{n\text{-}NPC}$) | ZVS | $V_{dc}/2$ |
| Auxiliary switch $S_{aux3}$ | ZCS | $V_{dc}/2$ |
| Auxiliary switch $S_{aux1}$, $S_{aux2}$ | ZCS | $3V_{dc}/4$ |

Other features which are considered as characteristic for the invention are set forth in the appended claims.

Although the invention is illustrated and described herein as embodied in a auxiliary resonant commutated pole three-point or multipoint converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
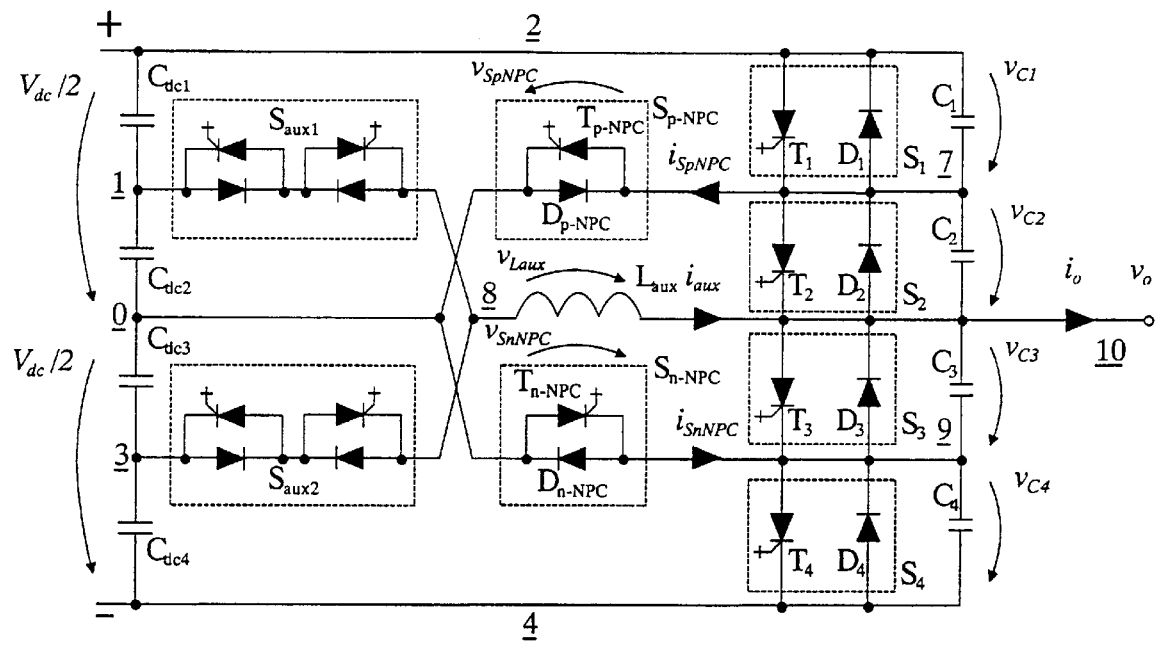
FIG. 1 is a circuit diagram of an output phase of an ARCP three-point converter with charge control switches according to the invention.

In all the figures of the drawing, sub-features and integral parts that correspond to one another bear the same reference symbol in each case. Referring now to the figures of the drawing in detail and first, particularly, to FIG. 1 thereof, there is shown a configuration of one output phase of a three-point converter containing a series circuit formed of main switches $S_1, S_2, S_3, S_4$ which are connected electrically in parallel with a DC voltage intermediate circuit. The intermediate circuit is formed of a series circuit containing capacitances (capacitors) $C_{dc1}, C_{dc2}, C_{dc3}, C_{dc4}$ of equal magnitude and connects a positive DC voltage rail 2 to a negative DC rail 4. While a junction point 0 of the capacitances $C_{dc2}$ and $C_{dc3}$ is referred to as a converter neutral point, junction points 1 and 3 represent the voltage neutral points for upper and lower converter levels, respectively.

Snubber capacitances C1, C2, C3, C4 are connected directly in parallel with each of the main switches $S_1$ to $S_4$. The switches $S_1$ to $S_4$ each contain a power semiconductor $T_1, T_2, T_3, T_4$, which can be switched off actively, with a back-to-back connected diode $D_1, D_2, D_3, D_4$. The converter neutral point 0 is connected to a junction point 7 of the main switches $S_1$ and $S_2$ through a charge control switch $S_{p\text{-}NPC}$, and to a junction point 9 of the main switches $S_3$ and $S_4$ through a charge control switch $S_{n\text{-}NPC}$. The charge control switches each consist of a power semiconductor $T_{p\text{-}NPC}$, $T_{n\text{-}NPC}$ which can be switched off actively, with a back-to-back connected diode $D_{p\text{-}NPC}, D_{p\text{-}NPC}$ which acts as a NPC diode (n=negative, p=positive).

In addition, the voltage neutral points 1 and 3 of the converter levels are respectively connected via an auxiliary switch $S_{aux1}$ and $S_{aux2}$ to a resonant inductance (generally an inductor) $L_{aux}$— see junction point 8. The other side of the resonant inductance $L_{aux}$ is connected to the output of the converter phase 10 (also referred to as a junction point at the same time). The auxiliary switches contain a series circuit with two power semiconductors, which can be switched off actively, with back-to-back connected diodes which are connected to one another so as to produce a bidirectional switch.

Figure 2:
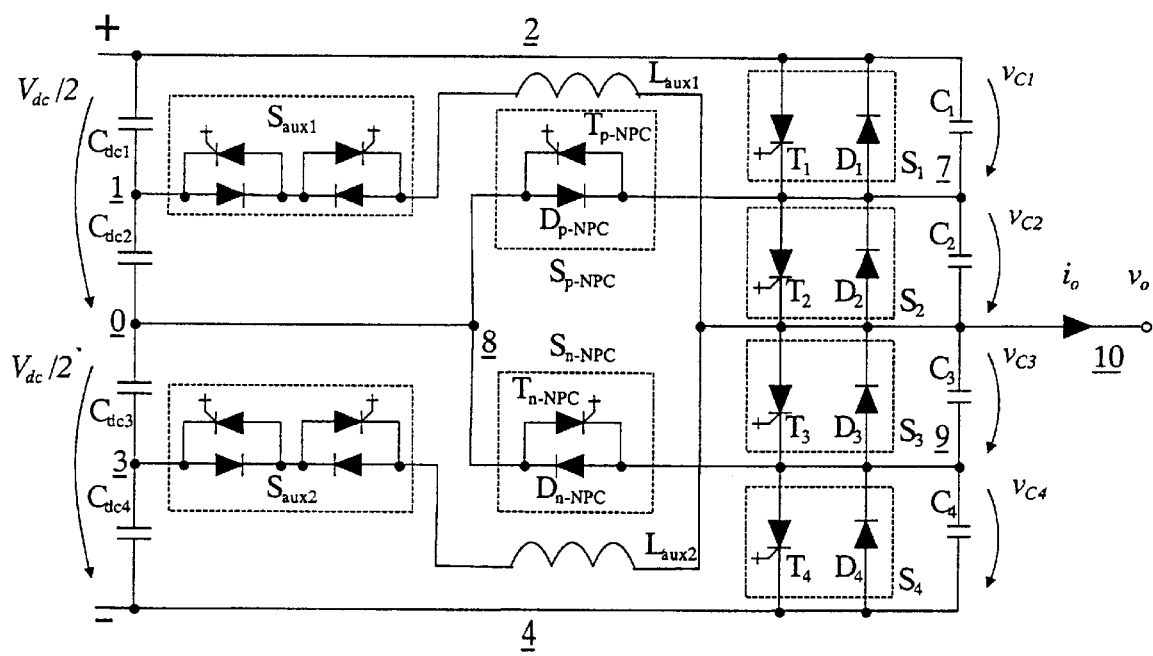
FIGS. 2 and 3 are circuit diagrams of alternative options for a configuration of inductance(s) in the ARCP three-point converter with charge control switches.

FIG. 2 shows one advantageous embodiment of the converter phase, with identical components being provided with the same reference symbols as in FIG. 1. In comparison with the embodiment in FIG. 1, two resonant inductances $L_{aux1}$ and $L_{aux2}$ are provided instead of one resonant inductance $L_{aux}$. The two resonant inductances $L_{aux1}$ and $L_{aux2}$ are respectively connected electrically in series with the auxiliary switch $S_{aux1}$ or $S_{aux2}$.

Figure 3:
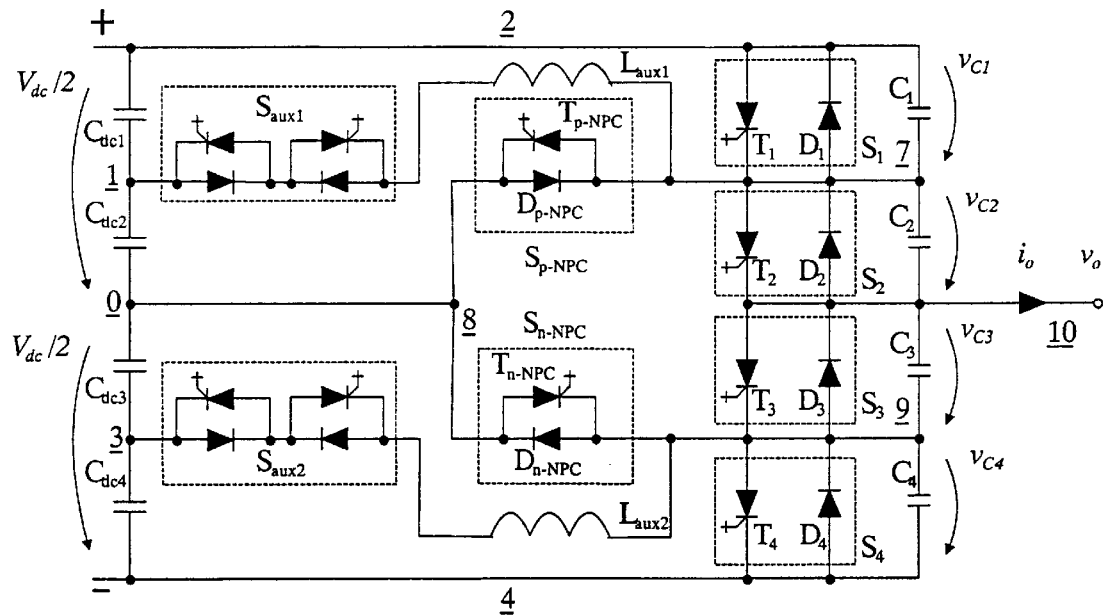

The embodiment shown in FIG. 3 differs from the embodiment in FIG. 2 in that the resonant inductances are coupled to the converter phase. These two resonant inductances $L_{aux1}$ and $L_{aux2}$ are respectively connected electrically in series with the auxiliary switch $S_{aux1}$ and $S_{aux2}$ and are connected directly to the junction points 7 and 9. The essential advantages of this configuration are that the maximum reverse-voltage load on the auxiliary switches $S_{aux1}$ and $S_{aux2}$ is only $V_{dc}/4$.

Figure 4:
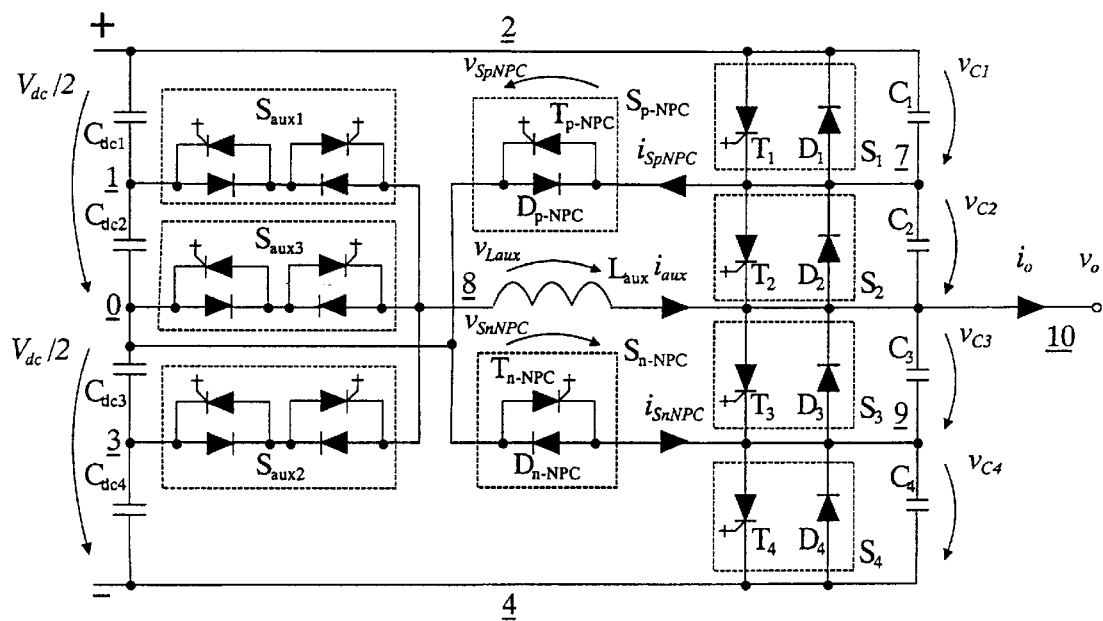
FIG. 4 is a circuit diagram of one phase of the ARCP three-point converter, which phase allows a direct change from a maximum positive voltage to a maximum negative voltage.

The embodiment shown in FIG. 4 differs from the embodiment in FIG. 1 in that an additional auxiliary switch $S_{aux3}$ is coupled between the converter neutral point 0 and the connection point 8 of the resonant inductance. This extends the operational capabilities of the converter in such a way that unloaded switching transitions from the maximum negative DC voltage level, of the DC voltage rail 4, to the maximum positive DC voltage level, of the DC voltage rail 2, are possible.

Figure 5:
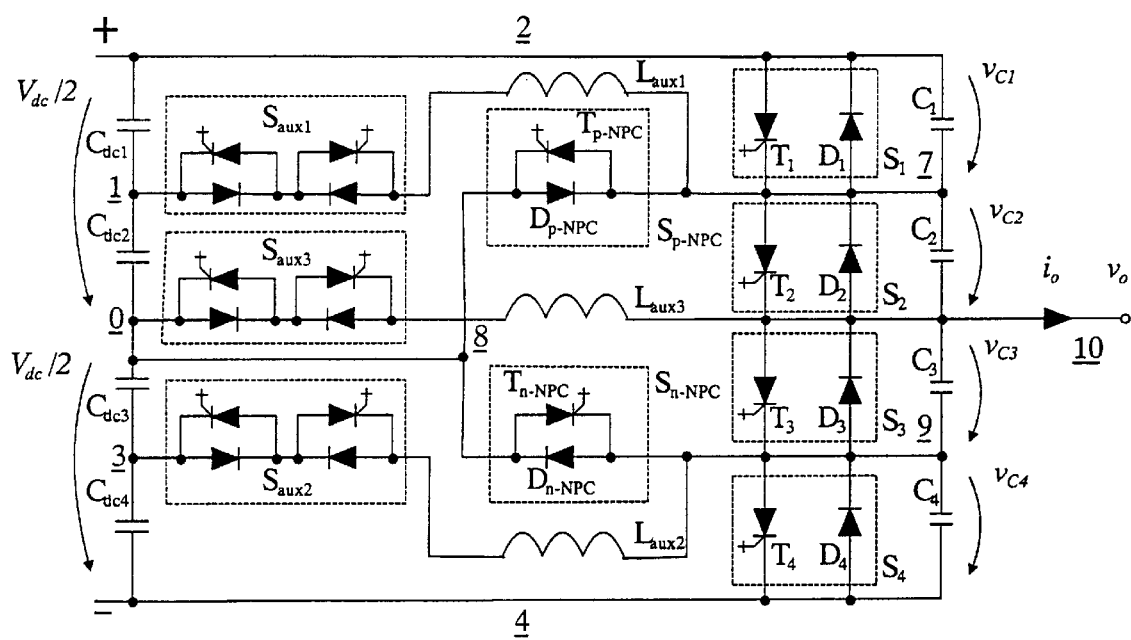
FIG. 5 is a circuit diagram of an alternative configuration option for the converter phase shown in FIG. 4.

The embodiment shown in FIG. 5 differs from the embodiment in FIG. 4 by having a series circuit containing the auxiliary switches $S_{aux1}$ and $S_{aux3}$ and the corresponding resonant inductances $L_{aux1}$ and $L_{aux3}$, and by these devices being coupled to the junction points 7, 10 and 9 in the converter phase. An advantageous feature of this configuration is that the auxiliary switches $S_{aux1}$ and $S_{aux2}$ are loaded with a maximum reverse voltage of $V_{dc}/4$.

Figure 6:
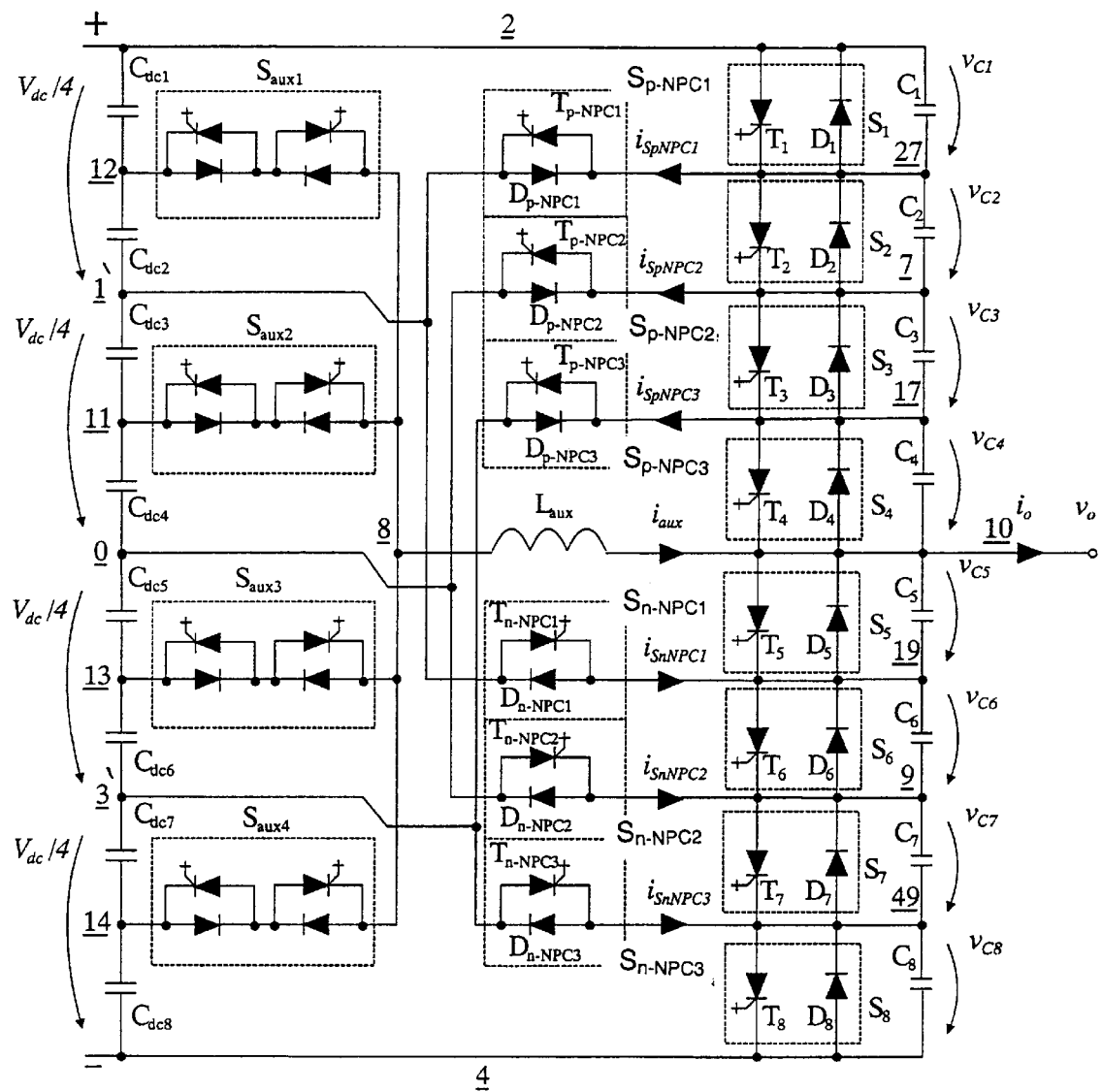
FIG. 6 is a circuit diagram of one phase of an ARCP five-point converter with the charge control switches, the one phase has been configured using the configuration guidelines.

FIG. 6 shows an extension of the embodiment shown in FIG. 1 to a low-loss-switching ARCP multipoint converter with more than three points, in which case, a series circuit containing two capacitances $C_{dc1} \ldots C_{dc8}$ in each converter level ensures that one voltage neutral point is available for the respective converter level, with the output of the converter phase 10 being connected to the voltage neutral points in each converter level, via a series circuit containing at least one resonant inductance $L_{aux}$ and independently controllable bidirectional auxiliary switches $S_{aux1} \ldots S_{aux4}$, wherein a single snubber capacitance C1 ... C8 is disposed in parallel with each individual main switch S1 ... S8, and wherein the charging of the snubber capacitances via the main switches is controlled by additional charge control switches $S_{p\text{-}NPC1}$, $S_{p\text{-}NPC2}, S_{p\text{-}NPC3}, S_{n\text{-}NPC1}, S_{n\text{-}NPC2}, S_{n\text{-}NPC3}$, which are connected back-to-back with the NPC diodes in the multipoint converter. An ARCP five-point converter is illustrated in this specific case.

In detail, the output phase of the five-point converter consists of a series circuit containing the main switches $S_1$ to $S_8$, which are connected electrically in parallel with the DC voltage intermediate circuit which is formed of a series circuit containing the capacitances $C_{dc1}$ to $C_{dc8}$ of equal magnitude, and thus connects the positive DC voltage rail 2 to the negative DC voltage rail 4. While the junction point 0 of the capacitances $C_{dc4}$ and $C_{dc5}$ is referred to as the converter neutral point, the junction points 1' and 3' represent the voltage neutral points for the upper and lower converter halves, and thus the junction points between the converter levels. The upper and lower converter halves in the five-point converter are subdivided once again into two converter levels in each case, so that there are a total of four converter levels.

The switches $S_1$ to $S_8$ each has the power semiconductor $T_1, T_2 \ldots$ which can be switched off actively, with a back-to-back connected diode $D_1, D_2 \ldots$.

The converter neutral point 0 is connected to the junction point 7 of the main switches $S_2$ and $S_3$ through the NPC diode $D_{p\text{-}NPC2}$, and to the junction point 9 of the main switches $S_6$ and $S_7$ through the NPC diode $D_{n\text{-}NPC2}$. The voltage neutral point 1' of the upper converter half is connected to the junction point 27 of the main switches $S_1$ and $S_2$ through the NPC diode $D_{p\text{-}NPC1}$, and to the junction point 19 of the main switches $S_5$ and $S_6$ through the NPC diode $D_{n\text{-}NPC1}$. The voltage neutral point 3' of the lower converter half is connected to the junction point 17 of the main switches $S_3$ and $S_4$ through the NPC diode $D_{p\text{-}NPC3}$ and to the junction point 49 of the main switches $S_7$ and $S_8$ through the NPC diode $D_{n\text{-}NPC3}$.

The snubber capacitances $C_1$ to $C_8$ are connected directly in parallel with the main switches $S_1$ to $S_8$. The charge control switches each have a power semiconductor $T_{p\text{-}NPC1} \ldots T_{n\text{-}NPC1} \ldots$, which can be switched off actively, and are connected back-to-back with each NPC diode.

In addition, the voltage neutral points 11, 12, 13, and 14 in all the converter levels are respectively connected via the auxiliary switches $S_{aux1} \ldots$ to $S_{aux4}$ to the resonant inductance $L_{aux}$, see junction point 8. The other side of the resonant inductance $L_{aux}$ is connected to the output 10 of the converter phase. The auxiliary switches $S_{aux1}$ to $S_{aux4}$ each have a series circuit containing two power semiconductors, which can be switched off actively with back-to-back connected diodes, which are connected to one another so as to produce a bidirectional switch.

In a similar way to the embodiment shown in FIG. 3, each bidirectional auxiliary switch in the five-point converter can also be connected to a separate resonant inductance. The reverse-voltage load on the auxiliary switches can thus be limited to a maximum of $\frac{3}{8}V_{dc}$, when the auxiliary switches are not connected to the resonant inductance at the point 8, but the points 12 and 27, 11 and 17, 13 and 19 as well as 14 and 49 are respectively connected to a series circuit containing a resonant inductance and a bidirectional auxiliary switch.

Figure 7:
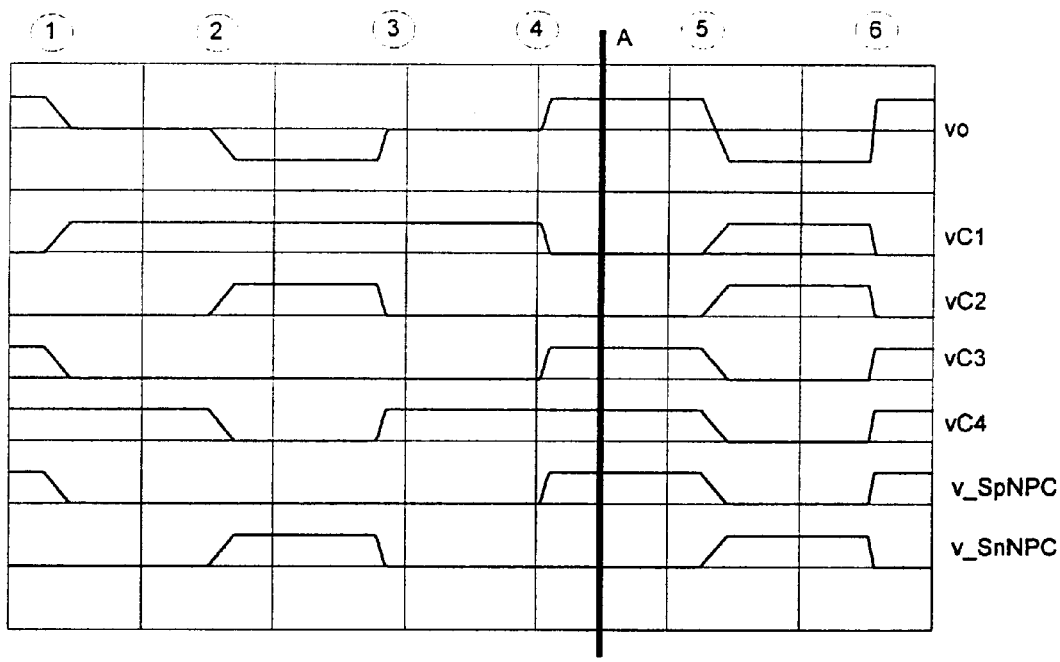
FIG. 7 is a graph showing, qualitatively, a profile of a voltage across snubber capacitances $C_1$ to $C_4$, a voltage across the charge control switches $V_{SpNPC}$ and $V_{SnNPC}$, as well as an output voltage $V_O$ for the ARCP three-point converter with charge control switches and a positive output $i_O$.

FIG. 7 shows the voltages $V_{C1}$–$V_{C4}$ across the snubber capacitances $C_1$–$C_4$, and thus the voltages across the main switches $S_1$ to $S_4$, a converter output voltage $v_o$ and a voltage across the charge control switches $V_{SpNPC}$ and $V_{SnNPC}$ for all possible commutation operations to the left of the mark A in the converter topologies in FIGS. 1 to 3. Assuming a positive load current $i_0$, a full switching sequence is shown, from the maximum positive output voltage $v_o$, via the maximum negative output voltage $v_o$, and back. The first two commutation operations ①② are capacitive commutation operations. The output voltage $v_o$ is changed back to the maximum positive output voltage once again by the two ARCP commutation operations ③④. All the commutation operations illustrated in FIG. 7 are possible for the converters shown in FIGS. 4 and 5. The two last commutation operations ⑤⑥ are direct transitions from the maximum positive output voltage to the maximum negative output voltage, in which case the former is once again a capacitive commutation operation ⑤, and the latter is an ARCP commutation operation ⑥. The subdivision scale of the ordinate corresponds to the magnitude of the DC voltage $V_{dc}$ in the DC voltage intermediate circuit. Since the voltage across the snubber capacitances corresponds to the voltages across the main switches, the reverse-voltage load on all the main switches can be determined from this to be $V_{dc}/2$. The commutation times are heavily dependent on the chosen circuit parameters. All the profiles are described in detail in the following text.

Figure 8:
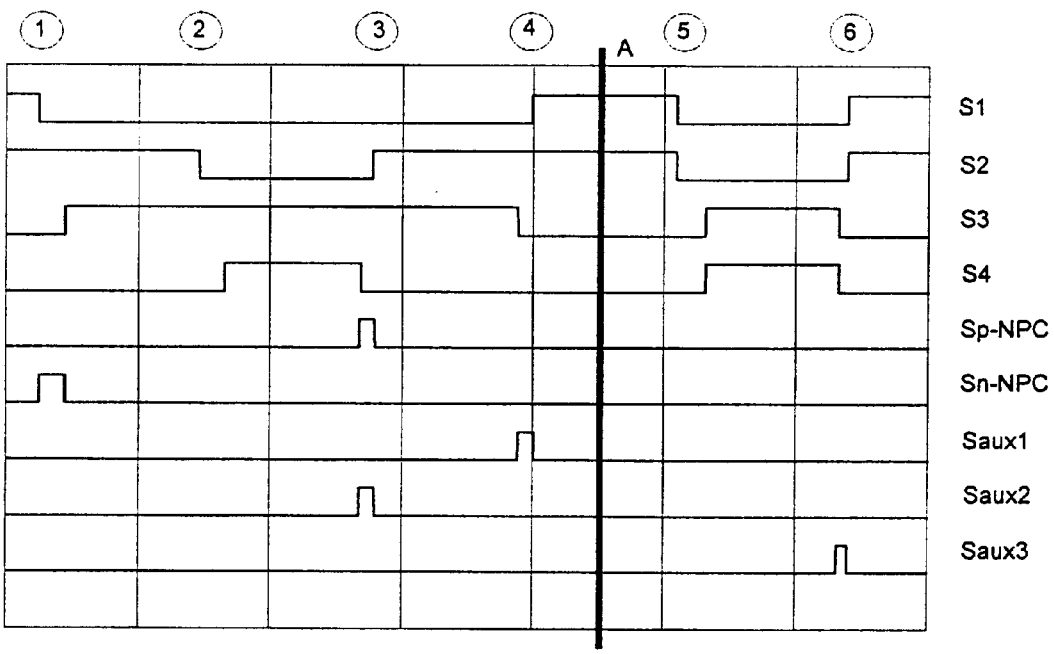
FIG. 8 is a graph showing switching states for all the controllable switches within a switching sequence for the ARCP three-point converter with charge control switches and the positive output current $i_O$.

FIG. 8 shows the logic states of all the switches in one converter phase of the ARCP three-point converter with the charge control switches, corresponding to the commutation operations illustrated in FIG. 7. Once again, the commutation operations to the right of the mark A can be carried out only by the extended topologies as shown in FIG. 4 or FIG. 5. All the auxiliary switches are switched on only during commutation operations, and do not affect steady-state operation of the converter.

Figure 9:
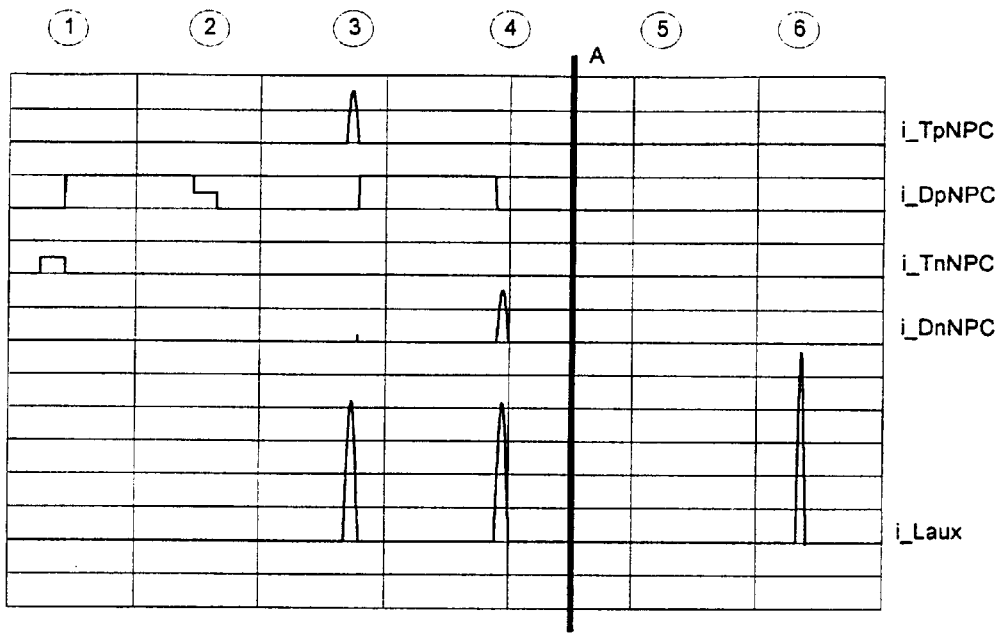
FIG. 9 is a graph showing qualitatively, the profile of currents through the charge control switches, contianing the active switches $T_{p\text{-}NPC}$, $T_{n\text{-}NPC}$ and NPC diodes $D_{p\text{-}NPC}$ and $D_{n\text{-}NPC}$, as well as the current through a resonant inductance $L_{aux}$ for the ARCP three-point converter.

FIG. 9 shows, qualitatively, current profiles through the charge control switches, in each case containing the active switch $T_{x-NPC}$ (x=p or n) and the NPC diode $D_{x-NPC}$, and through the resonant inductance $L_{aux}$. One ordinate subdivision corresponds to a magnitude of an output current $i_0$. The NPC diodes $D_{p-NPC}$ and $D_{n-NPC}$ are loaded with the output current $i_0$ even in the steady state "0", as in the hard-switching converter, with the output current direction determining whether the positive or the negative NPC diode is forward-biased. In addition, the NPC diodes and the charge control switches are loaded with the resonance phase current during the ARCP commutation operation, and with a portion of the charge-reversal current during the capacitive commutation operation. The commutation sequence corresponds to the descriptions relating to FIG. 7 and FIG. 8.

Figure 10:
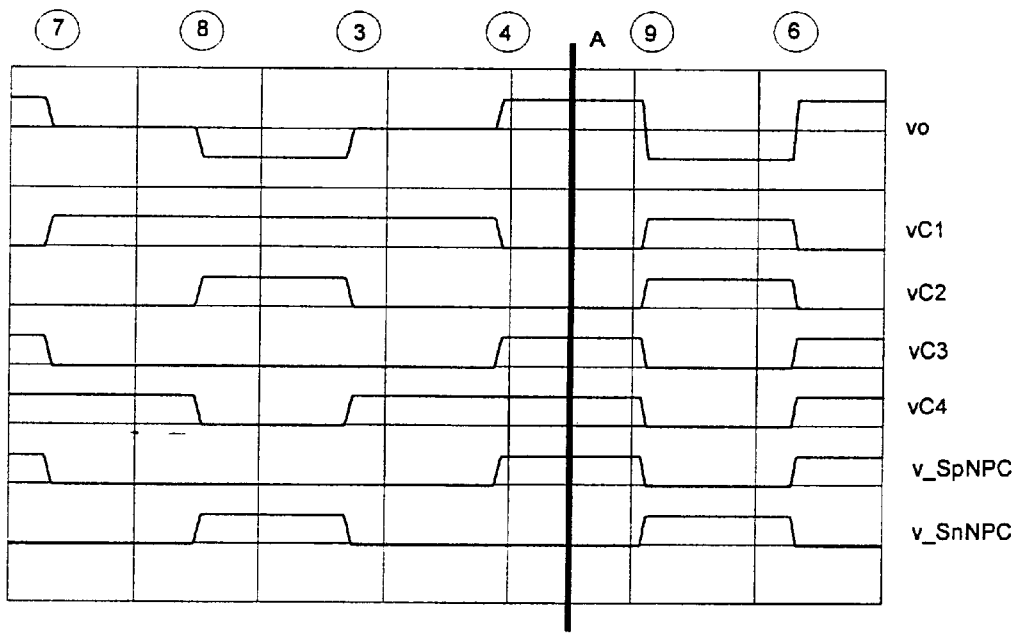
FIGS. 10–12 are graphs showing ARCP-assisted capacitive commutation for the ARCP three-point converter with the charge control switches (corresponding to FIGS. 7 to 9).

FIG. 10 corresponds to FIG. 7, but shows, qualitatively, the profile of the voltage across the snubber capacitances and the charge control switches for a switching sequence with ARCP-assisted capacitive commutation for the ARCP three-point converter with charge control switches. All the commutation operations shown to the left of the mark A are possible for the converters shown in FIGS. 1 to 3. The ordinate subdivision corresponds to the subdivision in FIG. 7.

Once again, rated reverse voltages of $V_{dc}/2$ are required for all the switches. The first two commutation operations ⑦⑧ are in this case ARCP-assisted capacitive commutation operations. The charges on the capacitors are not reversed linearly as in FIG. 7, but with the aid of resonant oscillation. The two subsequent ARCP commutation operations correspond quantitatively to the ARCP commutation operations ③④ in FIG. 7. All the commutation operations illustrated in FIG. 10 are possible for the converters shown in FIGS. 4 and 5. The last two commutation operations ⑨⑥ are direct transitions from the maximum positive output voltage $v_o$ to the maximum negative output voltage $v_o$, with the former being an ARCP-assisted capacitive commutation operation ⑨, and the latter being an ARCP commutation operation ⑥. Commutation times for the ARCP-assisted capacitive commutation operations are also heavily dependent on the chosen circuit parameters.

Figure 11:
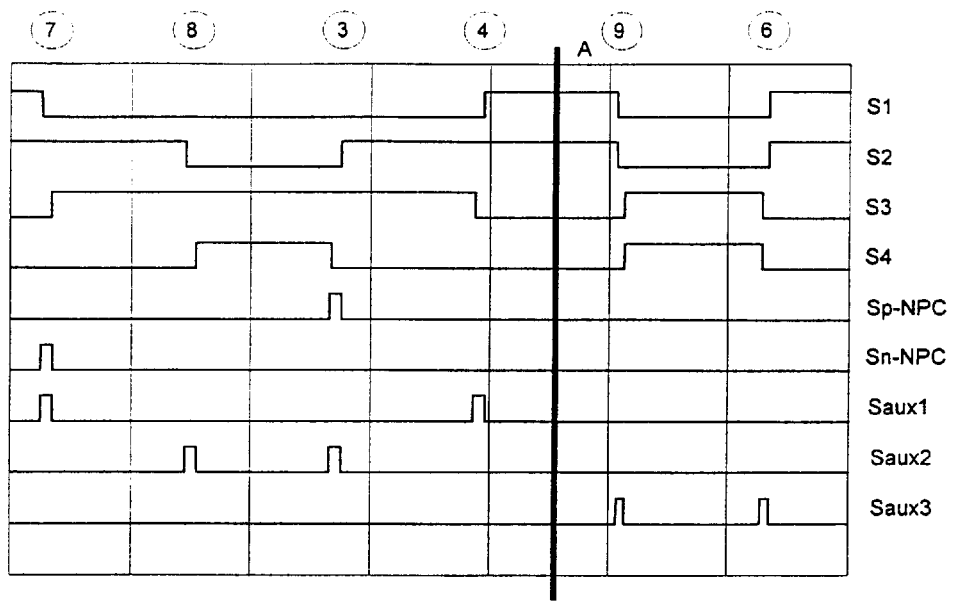

FIG. 11 corresponds to FIG. 8, and shows the drive logic for all the switches for the commutation operations discussed for FIG. 10. Once again, the auxiliary switches $S_{aux}$ and the charge control switches are activated only for the commutation operations.

Figure 12:
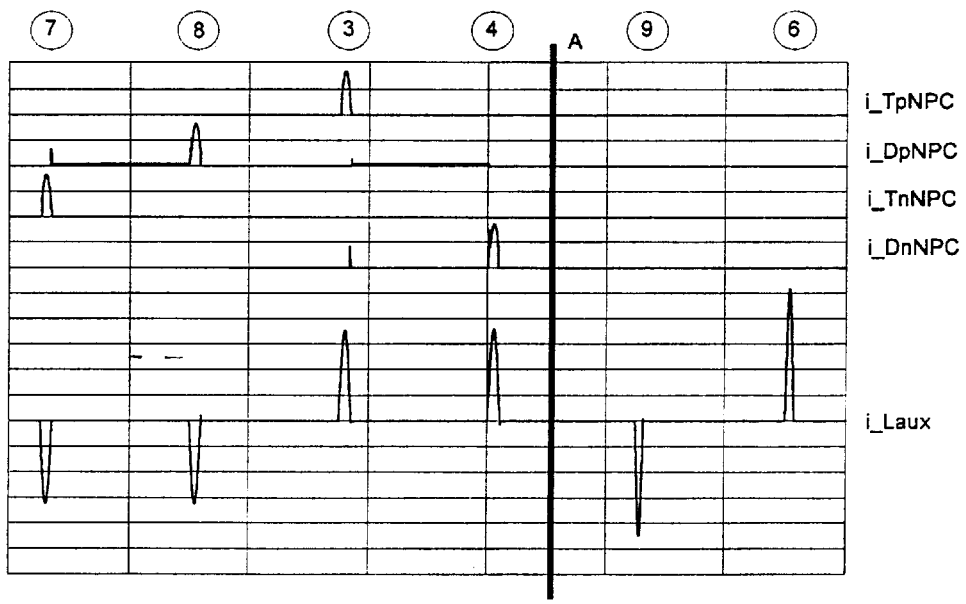

FIG. 12 shows, qualitatively, the profile of the currents in the charge control switches and in the NPC diodes, as well as the resonant inductance $L_{aux}$ for the commutation operations discussed in conjunction with FIG. 10. The ordinate scale has been transferred from FIG. 9, although the load current $i_0$ in this illustration corresponds to only about 10% of the load current in FIG. 9. All the illustrated current profiles are described in the following text. The statements made in conjunction with FIG. 9 apply to the current load on the NPC diodes.

The following text now describes the method of operation of the converter phase shown in FIG. 1 of the low-loss ARCP three-point converter according to the invention with the charge control switches, based on the commutation processes from the upper main switches $S_1$ and $S_2$ to the lower main switches $S_3$ and $S_4$, and back. The operation of any given three-point converter is governed by the switching states shown in Table 2, below, in order to achieve the desired output voltages $v_o$ with respect to the converter neutral point 0 (see column 2).

TABLE 2

Switching States for a Three-Point Converter

| Identification | Output voltage | $S_1$ | $S_2$ | $S_3$ | $S_4$ |
|---|---|---|---|---|---|
| P | +$V_{dc}/2$ | 1 | 1 | 0 | 0 |
| 0 | 0 | 0 | 1 | 1 | 0 |
| N | –$V_{dc}/2$ | 0 | 0 | 1 | 1 |

The following text provides a detailed description of the individual switching transitions for a positive output current $i_0$. The commutation operations p→0 and 0→n are in this case capacitive commutation operations and, respectively, ARCP-assisted capacitive commutation operations, and the commutation operations n→0 and 0→p are ARCP commutation operations.

If the output current is relatively low, the snubber capacitances are relatively large, and the DC voltage is relatively high, it is possible for undesirably long commutation times to occur for capacitive commutation. In order to shorten the commutation duration for capacitive commutation, the ARCP auxiliary path can be used to accelerate the commutation process, leading to an ARCP-assisted capacitive commutation process.

The following text relates to a commutation operation p→0 where $i_0>0$:

a) capacitive commutation (see Figure mark ①):

Before a start of the commutation operation, the main switches $S_1$ and $S_2$ are closed. The output current $i_0$ flows through the power semiconductors (switches) $T_1$ and $T_2$. The respective voltages across the switches $S_3$ and $S_4$ are $V_{C3}=V_{C4}=V_{dc}/2$. The inverse diodes $D_3$ and $D_4$ are thus reverse-biased.

The power semiconductor (switch) $T_{n\text{-}NPC}$ must be switched on actively before the start of the capacitive commutation operation, in order to ensure correct charge reversal on the snubber capacitances $C_1$ and $C_3$ during commutation, in parallel with the main switches $S_1$ and $S_3$ involved in the commutation operation. Since the voltage across the capacitor $C_4$ is equal to $V_{C4}=V_{dc}/2$, the power semiconductor (switch) $T_{n\text{-}NPC}$ is switched on when $V_{SnNPC}=0$ and thus in ZVS conditions. Since the switch $T_3$ is still switched off and the inverse diode $D_3$ is still reverse-biased, no current flows through the switch $S_{n\text{-}NPC}$.

The commutation operation starts when the switch $T_1$ is switched off actively. The load current $i_0$ commutates equally into the snubber capacitances $C_1$ and $C_3$, whose charges are reversed. In the process, the voltage across $C_3$ falls linearly while it rises linearly across $C_1$. As can be seen in FIG. 9, the switch $T_{n\text{-}NPC}$ now carries half the load current $I_{SnNPC}=i_0/2$. The other half flows via the positive DC voltage rail 2. Since the switch $T_{n\text{-}NPC}$ is switched on, the voltage across the capacitor $C_4$ remains constant at $V_{C4}=V_{dc}/2$.

The main switch commutation process ends when the voltage across the capacitor $C_3$ has reached the value $V_{C3}=0$ and the switch $S_3$ together with the diode $D_3$ is switched on when the ZVS condition is satisfied. The load current is now split equally between the series circuits $T_{n\text{-}NPC}/D_3$ and $T_2/D_{p\text{-}NPC}$. In this case, one of the two parallel paths—that with the switch $S_{n\text{-}NPC}$—can be switched off with low losses, that is to say when $V_{SnNpc}=0$, thus leading to the load current $i_0$ being transferred completely to the positive NPC diode $D_{p\text{-}NPC}$ (see FIG. 9). This is the end of the commutation process, and the "0" state has been reached. The switches $S_2$ and $S_3$ are switched on, and the voltages $V_{C1}$ and $V_{C4}$, are both $V_{dc}/2$. The auxiliary switches $S_{aux1}$ and $S_{aux2}$ are not activated for this commutation operation.

b) ARCP-assisted capacitive commutation (see Figure mark ⑦):

The switches $S_1$ and $S_2$ are closed before the start of the commutation operation. The load current $i_0$ flows through the switches $T_1$ and $T_2$. The voltage across each of the switches $S_3$ and $S_4$ is $V_{C3}=V_{C4}=V_{dc}/2$. The inverse diodes $D_3$ and $D_4$ are reverse-biased. Before the commutation operation can be started, the switch $T_{n\text{-}NPC}$ must be switched on in order to ensure correct charge-reversal of the snubber capacitances $C_1$ and $C_3$, in parallel with the main switches $S_1$ and $S_3$ that are involved with the commutation, during the commutation operation. Since the voltage across the capacitance $C_4$ is $V_{C4}=V_{dc}/2$, the switch $T_{n\text{-}NPC}$ is switched on when $V_{SnNPC}=0$, and thus in ZVS conditions. However, no current flows through the switch yet since $T_3$ is switched off and the inverse diode $D_3$ is reverse-biased owing to the reverse voltage of $V_{dc}/2$. The commutation process is started when $S_{aux1}$ is switched on, when $i_{aux}=0$ (ZCS). Since the voltage across the inductance $L_{aux}$ is now negative $V_{Laux}=-V_{dc}/4$, a negative current rise $i_{aux}$ occurs in the auxiliary path. When the current in $T_1$ and $T_2$ (which contains the superimposition of the load current $i_0$ and the current $i_{aux}$) reaches a specific value, which can be chosen freely, the main switch commutation process is started by switching $T_1$ off actively. The current level at which the switching-off process takes place is chosen so that the commutation duration is within the maximum desired commutation duration.

Once $T_1$ has been switched off, the charge-reversal current (containing a superimposition of the load current $i_0$ and the current $i_{aux}$ commutates into the snubber capacitances (capacitors) $C_1$ and $C3$ and reverses their charges. In this case, the capacitor $C_1$ is charged non-linearly, while the capacitor $C_3$ is discharged in a corresponding manner. The switch $T_{n\text{-}NPC}$ now carries half the charge-reversal current (see FIG. 12). The other half is carried by the positive DC voltage rail 2. The voltage across the capacitance $C_4$ is in this case kept constant at $V_{C4}=V_{dc}/2$ since the switch $S_{n\text{-}NPC}$ is closed.

The main switch commutation process ends when the voltage across $C_3$ reaches the value $V_{C3}=0$ and the switch $S_3$ is switched on in the ZVS conditions. The load current $i_0$ with the superimposed current $i_{aux}$, half of which is in each case carried by the positive DC voltage rail 2 and the series circuit containing $T_{n\text{-}NPC}$ and $D_3$ during the commutation process, commutates, when $S_3$ is switched on, from the positive DC voltage rail 2 to the series circuit containing $S_2$ and $D_{p\text{-}NPC}$. As can also be seen in FIG. 12, half of the load current $i_0$ with the superimposed current $i_{aux}$ is now carried by the series circuit containing $T_{n\text{-}NPC}$ and $D_3$, while the other half is carried by $S_2$ and the positive NPC diode $D_{p\text{-}NPC}$. There is now a positive voltage of $V_{Laux}=V_{dc}/2$ across the inductance $L_{aux}$ in the auxiliary path, leading to a positive current gradient in $i_{aux}$. When the current $i_{aux}$ reaches the value $i_{aux}=0$, the switch $S_{aux1}$ can be switched off in ZCS conditions. A current equal to the load current $i_0$ thus now flows through the parallel paths $T_{n\text{-}NPC}/D_3$ and $S_2/D_{p\text{-}NPC}$. Finally, one of the two parallel paths—the path with the switch $S_{n\text{-}NPC}$—can now be switched off with low losses, that is to say when $V_{SnNPC}=0$, thus allowing the load current $i_0$ to commutate completely onto the positive NPC diode $D_{p\text{-}NPC}$ (see FIG. 12). This ends the entire commutation process, and the converter path has reached the "0" state.

The following text now deals with a commutation operation 0→n where $i_0>0$:

a) Capacitive commutation (see figure mark ②):

The switches $S_2$ and $S_3$ are closed before the start of the commutation operation. The load current $i_0$ flows through $T_2$ and the positive NPC diode $D_{p\text{-}NPC}$. The voltage across the respective switches $S_1$ and $S_4$ is $V_{C1}=V_{C4}=V_{dc}/2$. The inverse diodes $D_1$ and $D_4$ are thus reverse-biased.

The commutation process is initiated by the switch $T_2$ being switched off actively. Since the switch $S_3$ is switched on, the load current $i_0$ commutates equally into the capacitors $C_2$ and $C_4$, with their charges being reversed. In the process, the voltage across the capacitor $C_2$ rises linearly, while the voltage across the capacitor $C_4$ falls linearly. Reversal of the charge on the capacitor $C_1$ is prevented, as required, by the NPC diode $D_{p\text{-}NPC}$, which provides a path for the charge-reversal current for the capacitor $C_2$. The voltages across $C_1$ and $C_3$ thus respectively remain $V_{C1}=V_{dc}/2$ and $V_{C3}=0$. The positive NPC diode $D_{p\text{-}NPC}$ and the negative DC voltage rail 4 each now carry half the load current $i_0$ (see FIG. 9). The commutation process ends when the voltage across $C_4$ reaches the value $V_{C4}=0$ and the switch $S_4$ is switched on in ZVS conditions. The load current $i_0$, half of which was in each case carried by the series circuit containing $S_2$ and the positive NPC diode $D_{p-NPC}$, and half by the negative DC voltage rail 4 during the commutation operation, now commutates completely onto the inverse diodes $D_3$ and $D_4$. The commutation operation thus ends, and the "n" state has been reached, with an output voltage of $V_0=-V_{dc}/2$. For this commutation operation, there is no need for the switch $T_{p-NPC}$ to be switched on actively for charge control, since the positive NPC diode $D_{p-NPC}$ provides a current path for reversing the charge on the capacitor $C_2$. The auxiliary switches $S_{aux1}$ and $S_{aux2}$ are not activated for this commutation operation.

b) ARCP-assisted capacitive commutation (see Figure mark ⑧):

The switches $S_2$ and $S_3$ are closed before the start of the commutation process. The load current $i_0$ flows through $T_2$ and the positive NPC diode $D_{p-NPC}$. The voltage across the respective switches, $S_1$ and $S_4$ is $V_{C1}=V_{C4}=V_{dc}/2$. The inverse diodes $D_1$ and $D_4$ are thus reverse-biased.

The commutation process starts when the auxiliary switch $S_{aux2}$ is switched on when $i_{aux}=0$ (ZCS). Since, as a result of this, the voltage across the inductance $L_{aux}$ is negative, $V_{Laux}=-V_{dc}/4$, there is a negative current rise $i_{aux}$ in the auxiliary path. When the current in $T_2$ (including the superimposition of $i_0$ and $i_{aux}$) reaches a specific value, which can be chosen freely, the main switch commutation operation is started by switching $T_2$ off actively. The current level at which it is switched off is chosen such that the commutation duration is within the desired maximum commutation duration.

Since $S_3$ remains switched on, the load current $i_0$ with the superimposed current $1_{aux}$ commutates, once $T_2$ has been switched off, into the capacitors $C_2$ and $C_4$ and reverses the charges. In the process, the voltage across the capacitor $C_2$ rises non-linearly, while the voltage across the capacitor $C_4$ falls in a corresponding manner. The positive NPC diode $D_{p-NPC}$, which in this commutation operation provides a path for the charge-reversal current of the capacitor $C_2$ (see FIG. 12) and thus prevents the charge on $C_1$ from being reversed, as required, and the negative DC voltage rail 4 now each carry half of the load current $i_0$ with the superimposed current $i_{aux}$. The voltages across the respective capacitors $C_1$ and $C_3$ thus remain constant at $V_{C1}=V_{dc}/2$ and $V_{C3}=0$ (see FIG. 10). Since the charge distribution of the snubber capacitances is controlled by the positive NPC diode $D_{p-NPC}$, there is no need for the switch $S_{p-NPC}$ to be switched on actively by use of $T_{p-NPC}$ for this commutation operation.

The main switch commutation operation ends when the voltage across the capacitor $C_4$ reaches the value $V_{C4}=0$ and the switch $S_4$ has been switched on in ZVS conditions. The charge-reversal current, containing the load current $i_0$ and the current $i_{aux}$ now commutates from the positive snubber diode $D_{p-NPC}$, which carried half this charge-reversal current during the commutation operation, completely to the inverse diodes in $S_3$ and $S_4$. A positive voltage Of $V_{Laux}=V_{dc}/4$ is now present across the inductance $L_{aux}$ in the auxiliary path, leading to a positive current gradient in $i_{aux}$. When the current $i_{aux}$ reaches the value $i_{aux}=0$, the switch $S_{aux2}$ can be switched off in ZCS conditions. This ends the entire commutation operation, and the converter path has reached the "n" state.

The following text deals with the commutation operation n→0 where $i_0>0$:

The ARCP commutation (see Figure mark ③):

The switches $S_3$ and $S_4$ are switched on before the start of the commutation operation. The load current $i_0$ flows through the inverse diodes $D_3$ and $D_4$. The voltage across the respective switches $S_1$ and $S_2$ is $V_{C1}=V_{C2}=V_{dc}/2$. The inverse diodes $D_1$ and $D_2$ are thus reverse-biased.

Before the commutation operation can be started, the switch $T_{p-NPC}$ must be switched on actively in order to ensure that the charge on the snubber capacitances of the main switches $S_2$ and $S_4$ involved in the commutation operation is reversed correctly during the commutation operation. Since the voltage across the capacitor $C_1$ is $V_{C1}=V_{dc}/2$, the switch $T_{p-NPC}$ is closed in ZVS conditions when $V_{SnNPC}=0$. No current flows through this switch yet, since the switch $T_2$ is still switched off, and the inverse diode $D_2$ is reverse-biased since $V_{C2}=V_{dc}/2$.

The commutation operation is started when the auxiliary switch $S_{aux2}$ is switched on when $i_{aux}=0$ (ZCS). Since the voltage across the inductance $L_{aux}$ is positive $V_{Laux}=V_{dc}/4$, the positive current rise $i_{aux}$ occurs in the auxiliary path. When this current $i_{aux}$ reaches a specific value $1_{boost}<0$ where $1_{boost}=i_{aux}-i_0$, the commutation operation is started by $T_4$ being switched off actively. This value of the boost current $1_{boost}$ can be chosen freely, but has to have a minimum value which guarantees that the voltage across the capacitor $C_2$ changes over completely to the value $V_{C2}=0$ even with a lossy, non-ideal configuration. Since the switch $S_3$ is switched on, the difference between the load current $i_0$ and the auxiliary current $i_{aux}$ commutates into the capacitors $C_4$ and $C_2$, which results in the capacitor $C_2$ being discharged, and the capacitor $C_4$ being charged. The switch $T_{p-NPC}$ now carries half the resonant current, while the other half is carried by the negative DC voltage rail 4 (see FIG. 9). Since the charge-reversal current for the capacitor $C_2$ is carried by the charge control switch $S_{p-NPC}$, the voltage across $C_1$ remains constant at $V_{C1}=V_{dc}/2$ (see FIG. 6).

When the voltage across the capacitor $C_2$ reaches the value $V_{C2}=0$ the switch $S_2$ is switched on in ZVS conditions. The capacitor voltages across $C_2$ and $C_4$ are now maintained at $V_{C2}=0$ and $V_{C4}=V_{dc}/2$, respectively (see FIG. 10), and half the charge-reversal current (formed of the difference between the load current $i_0$ and the current $i_{aux}$) which was carried by the negative DC voltage rail now commutates briefly onto the negative NPC diode $D_{n-NPC}$, while the other half continues to flow through the switch $S_2$ and the positive charge control switch $S_{p-NPC}$ (see FIG. 9 and FIG. 12, respectively). A negative voltage of $V_{Laux}=-V_{dc}/4$ is now present across the inductance $L_{aux}$ in the auxiliary path, leading to a negative current gradient $i_{aux}$. When the current $i_{aux}$ reaches the value $i_{aux}=0$, the switch $S_{aux2}$ can be switched off in ZCS conditions. Finally, the switch $T_{p-NPC}$ can be switched off in ZVS conditions, since the positive NPC diode $D_{p-NPC}$ has now taken over the entire load current $i_0$ from the negative NPC diode $D_{n-NPC}$ and the switch $T_{p-NPC}$. The commutation process thus ends, and the converter path has reached the "0" state.

The following text now deals with a commutation operation 0→p where $i_0>0$:

The ARCP commutation (see Figure mark ④):

The switches $S_2$ and $S_3$ are closed before the start of the commutation operation. The load current $i_0$ flows through $T_2$ and the positive NPC diode $D_{p-NPC}$, The voltage across the respective switches $S_1$ and $S_4$ is $V_{C1}=V_{C4}=V_{dc}/2$. The inverse diodes $D_1$ and $D_4$ are thus reverse-biased.

The switching on of the auxiliary switch $S_{aux1}$, when $i_{aux}=0$ (ZCS) starts the commutation operation. Owing to the positive voltage of $V_{Laux}=V_{dc}/4$ across the auxiliary inductance $L_{aux}$, there is a positive current rise in the current $i_{aux}$. When the current $i_{aux}$ reaches the value $1_{boost}>0$ where $1_{boost}=i_{aux}-i_0$, the commutation process is started by switching $T_3$ off actively. The minimum boost current $1_{boost}$ is once again governed by the oscillation-reversal condition $V_{C1} \leq 0$. Since the switch $S_2$ is switched on, the difference between the load current $i_0$ and the current $i_{aux}$ commutates into the capacitors $C_1$ and $C_3$ which leads to the capacitor $C_3$ being charged, and to the capacitor $C_1$ being discharged. Negative NPC diode $D_{n-NPC}$ which in this case provides a current path for reversing the charge on the capacitor $C_3$ while the voltage across the capacitor $C_4$ remains constant, carries half the charge-reversal current, while the other half is carried by the positive DC voltage rail 2. The voltage across the capacitor $C_4$ thus remains constant and $V_{C4}=V_{dc}/2$.

When the voltage across $C_1$ reaches the value $V_{C1}=0$, the switch $S_1$ is closed in ZVS conditions. The voltages across the respective capacitors $C_1$ and $C_3$ are now maintained as $V_{C1}=0$ and $V_{C3}=V_{dc}/2$ (see FIG. 6), and the current flow, amounting to half the charge-reversal current, through the negative NPC diode $D_{n-NPC}$ is interrupted (see FIG. 9), resulting in the charge-reversal current being commutated completely onto the switches $S_1$ and $S_2$. A negative voltage $V_{Laux}=V_{dc}/4$ is now present across the auxiliary path, leading to a negative gradient in the current $i_{aux}$. When the current $i_{aux}$ reaches the value $i_{aux}=0$, the switch $S_{aux1}$ is switched off in ZCS conditions. This ends the commutation process, and the converter path has reached the "p" state. There is no need for the negative charge control switch $S_{n-NPC}$ to be switched on actively for this commutation operation, since the NPC diode $D_{n-NPC}$ automatically carries out the correct charge control in the snubber capacitances.

Owing to the symmetrical structure, the commutation operations for negative output currents $i_0<0$ are analogous, but the p→0 and 0→n transitions are now ARCP commutation operations, and the n→0 and 0→p transitions are capacitive and ARCP-assisted capacitive commutation operations, respectively.

The direction of the output current by $i_0$ is irrelevant to the decision as to which of the auxiliary switches $S_{aux}$, must be activated for ARCP commutation or ARCP-assisted capacitive commutation. The switch $S_{aux1}$ must always be activated for ARCP commutation operations and ARCP-assisted capacitive commutation operations, respectively, from 0→p or from p→0. Analogously, the ARCP commutation operations and ARCP-assisted capacitive commutation operations in the lower converter half from 0→n and from n→0 must be carried out using only the auxiliary switch $S_{aux2}$.

However, the current direction does influence whether it is or is not necessary to activate the active switch in the charge control switch. The criterion is the presence of a current path for the charge-reverse current for the snubber capacitors which are connected across the main switches, which carry out a switching transition, and which charge-reversal current must not pass via those snubber capacitors which are connected in parallel with the main switches that are not involved in the commutation operation. In 50% of commutation situations, there is a current path from the NPC diodes $D_{p-NPC}$ and $D_{n-NPC}$ in the three point converter. Since switching the charge control switches on actively by use of $T_{p-NPC}$ or $T_{n-NPC}$ would have no affect, but would not be incorrect, the described activation criterion, ignoring the forward direction of the NPC diodes, may be regarded as a sufficient condition for operation of the ARCP converter with the charge control switches.

The extended operation of the converter will now be described in the following text, which allows direct commutation operations from p→n and n→p on the basis of the configurations shown in FIGS. 4 and 5. For a positive output current $i_0>0$ the p→n transitions are capacitive commutation operations or ARCP-assisted capacitive commutation operations, while the n→p transitions are ARCP commutation operations. The auxiliary switches $S_{aux1}$ and $S_{aux2}$ as well as the charge control switches $S_{p-NPC}$ and $S_{n-NPC}$ are not required for the commutation operations described in the following text.

The following text now deals with a p→n commutation operation where $i_0>0$:

a) Capacitive commutation (see Figure mark ⑤)

The switches $S_1$ and $S_2$ are closed before the start of the commutation operation. The output current $i_0$ flows through the switches $T_1$ and $T_2$. The voltage across the respective switches $S_3$ and $S_4$ is $V_{C3}=V_{C4}=V_{dc}/2$. The inverse diodes $D_3$ and $D_4$ are thus reverse-biased.

The commutation process starts when the switches $T_1$ and $T_2$ are jointly switched off actively, as required. The load current $i_0$ commutates into the snubber capacitors $C_1$, $C_2$, $C_3$ and $C_4$, with the capacitors $C_1$ and $C_2$ being charged linearly, and the capacitors $C_3$ and $C_4$ being discharged linearly. The positive DC voltage rail 2 and the negative DC voltage rail 4 in this case each carry half the load current $i_0$.

The commutation operation ends when the voltages across the capacitors $C_3$ and $C_4$ reach the value $V_{C3}=V_{C4}=0$, and the switches $D_3$ and $D_4$ are switched on in ZVS conditions. The voltages $V_{C1}$ and $V_{C2}$ are thus both $V_{dc}/2$. The load current commutates completely onto the switches $S_3$ and $S_4$. The commutation operation is thus complete, and the "n" state is reached. The auxiliary switch $S_{aux3}$ is not activated in this commutation operation.

b) ARCP-assisted capacitive commutation (see Figure mark ⑦):

The switches $S_1$ and $S_2$ are closed before the start of the commutation operation. The load current $i_0$ flows through the switches $T_1$ and $T_2$. The voltage across the respective switches $S_3$ and $S_4$ is $V_{C3}=V_{C4}=V_{dc}/2$. The inverse diodes $D_3$ and $D_4$ are thus reverse-biased.

The commutation process is started by switching on $S_{aux3}$ when $i_{aux}=0$ (ZCS), owing to the negative voltage $V_{Laux}=-V_{dc}/2$ across the inductance $L_{aux}$, there is a negative current rise $i_{aux}$ in the auxiliary path. When the current in $T_1$ and $T_2$ includes a load current $i_0$ and the superimposed current $i_{aux}$ reaches a specific value which can be chosen freely, the main switch commutation process is started by switching $T_1$ and $T_2$ off together. The current level at which they are switched off is chosen such that the commutation duration is within the desired maximum commutation duration.

Once the two main switches $T_1$ and $T_2$ have been switched off, the load current $i_0$ with the superimposed auxiliary current $i_{aux}$ commutated such that half of it flows through the snubber capacitors $C_1$ and $C_2$ and half through $C_3$ and $C_4$. In this case, the capacitors $C_1$ and $C_2$ are charged non-linearly, while the capacitors $C_3$ and $C_4$ are discharged in a corresponding manner. The main switch commutation operation ends when the voltages across the capacitors $C_3$ and $C_4$ reach the values $V_{C3}=V_{C4}=0$, and the switches $S_3$ and $S_4$ are switched on in ZVS conditions. The load current now commutates into the switches $S_3$ and $S_4$. There is thus a positive voltage of $V_{Laux}=V_{dc}/2$ across the inductance $L_{aux}$ in the auxiliary path, which leads to the current $i_{aux}$ having a positive current gradient. When the current $i_{aux}$ reaches the value $i_{aux}=0$, the switch $S_{aux3}$ can be switched off in ZCS conditions. The entire commutation operation is thus complete, and the converter path has reached the "n" state.

The following text now deals with an n→p commutation operation where $i_0>0$:

ARCP commutation (see Figure mark ⑥):

The switches $S_3$ and $S_4$ are closed before the start of the commutation operation. The load current flows through the inverse diodes $D_3$ and $D_4$. The voltage across the respective switches $S_1$ and $S_2$ is $V_{C1}=V_{C2}=V_{dc}/2$. The inverse diodes $D_1$ and $D_2$ are reverse-biased.

The commutation operation is started by switching on the auxiliary switch $S_{aux3}$ when $i_{aux}=0$ (ZCS). Owing to the positive voltage of $V_{Laux}=V_{dc}/2$ across the auxiliary inductance $L_{aux}$ the current $i_{aux}$ has a positive current rise. When the current $i_{aux}$ reaches a value $1_{boost}>0$ where $1_{boost}=i_{aux}-i_0$, the main switch commutation operation is started by switching $T_3$ and $T_4$ off actively at the same time. The minimum boost current results from the oscillation reversal condition $V_{C1}\approx V_{C2}\leq 0$ which must be satisfied to achieve the ZVS response from the main switches. Half of the difference between the load current $i_0$ and the current $i_{aux}$ commutates into the snubber capacitors $C_1$ and $C_2$, and the other half commutates into $C_3$ and $C_4$, with the capacitors $C_1$ and $C_2$ being discharged non-linearly, while the capacitors $C_3$ and $C_4$ are charged in a corresponding manner.

When the voltages across $C_1$ and $C_2$ reach the value $V_{C1}=V_{C2}=0$, the switches $S_1$ and $S_2$ are switched on in ZVS conditions. Since the voltage across the capacitors $C_3$ and $C_4$ is now maintained at $V_{C3}=V_{C4}=V_{dc}/2$, the load current commutates completely on the switches $S_1$ and $S_2$. There is now a negative voltage $V_{Laux}=-V_{dc}/2$ across the auxiliary path, which leads to the current $i_{aux}$, having a negative gradient. When the current reaches the value $i_{aux}=0$, the switch $S_{aux3}$ can be switched off in the ZCS conditions. The commutation operation is thus complete, and the converter path has reached the "p" state.

Owing to the symmetrical structure, the commutation operations for negative output currents $i_0<0$ are analogous, but the p→n transitions are now ARCP commutation operations, and the n→p transitions are capacitive or ARCP-assisted capacitive commutation operations.

The following text describes the extension of the topology (three-point converter) illustrated in FIG. 1 to multipoint converters.

Hard-switching multipoint converters with a NPC diode can be modified in accordance with the extensions described above to produce the ARCP converter with the charge control switches. The commutation operations that may be carried out in these converters correspond to the three described commutation types—ARCP commutation, capacitive commutation and ARCP-assisted capacitive commutation.

General relationships with regard to the commutation operations in the ARCP multipoint converters with charge control switches will now be described using the example of the five-point converter shown in FIG. 6. Although four main switches, instead of the two main switches in the three-point converter are switched on in one state in a five-point converter, commutation operations between one converter level and a level located above or below it are always carried out using two individual main switches. As a result of this fact, the statements made with reference to three-point converters can be transferred directly, and the control problem can be reduced to choice of the correct auxiliary switches $S_{aux}$ and the charge control switches $S_{n-NPC}$ and $S_{p-NPC}$. In general, it can be stated that the auxiliary switch $S_{aux}$ must be used for the ARCP commutation and for the ARCP-assisted capacitive commutation, which auxiliary switch $S_{aux}$, in terms of the voltage potential at its connection point to the DC voltage capacitances lies exactly in the center between the two potentials between which the output voltage $v_o$ is commutated. Thus, for example, in the case of the ARCP commutation of the output voltage $v_o$ from $+V_{dc}/4$ to $+V_{dc}/2$ with respect to the converter neutral point 0, the switch $S_{aux1}$, which is at a potential of $+\frac{3}{8}V_{dc}$ with respect to the converter neutral point, is connected in series with the resonant inductance $L_{aux}$.

The choice of the charge control switches which are involved in a specific commutation operation is made on the basis that the only snubber capacitances whose charges are reversed during the commutation operation are those whose parallel-connected main switches are involved in the commutation process with a switching transition. The commutation type is in this case irrelevant to the choice of the charge control switches.

In the example just described, of commutation of the output voltage $v_o$ from $+V_{dc}/4$ to $+V_{dc}/2$ with respect to the converter neutral point 0, these would be the switches $S_1$ and $S_5$. The closed switches $S_2$, $S_3$ and $S_4$ as well as the open switches $S_6$, $S_7$ and $S_8$ remain unaffected by the commutation operation. The charge control switches allow current paths to be ensured which reverse the charge on the capacitances $C_1$ and $C_5$ without reversing the charges on the other capacitances at the same time. In this situation, this can be ensured on the one hand by the positive DC voltage rail 2, and on the other hand by a closed switch $S_{n-NPC1}$ formed by $D_{n-NPC1}$ and $T_{n-NPC1}$. In detail, this commutation operation corresponds to ARCP commutation in the three-point converter. Depending on the direction of the output current, it is in some cases also possible to dispense with the switches $T_{n-NPC}$ and $T_{p-NPC}$ being switched on actively, since the snubber diodes $D_{n-NPC}$ and $D_{p-NPC}$ carry out correct charge control automatically.

With the modifications described with reference to FIG. 6, it is thus possible to use the principle of ARCP commutation with charge control switches for multipoint converters having more than three points.

I claim:

1. A multipoint converter, comprising:
   at least four main switches per converter phase disposed in series defining a first series circuit, said main switches to be connected electrically in parallel between DC voltage rails formed of a positive DC voltage rail and a negative DC voltage rail;
   snubber capacitances, one of said snubber capacitances disposed in parallel with each of said main switches and said snubber capacitances defining junction points between adjacent pairs of said snubber capacitances;
   at least two converter levels having voltage neutral points disposed between the DC voltage rails, a junction point formed between each adjacent pair of said
   converter levels and said voltage neutral points of said converter levels being accessible;
   a second series circuit formed of at least one resonant inductance and independently controllable bidirectional auxiliary switches;
   an output of said converter phase connected to said voltage neutral points of said converter levels via said second series circuit, said output further connected to one of said junction points formed by said snubber capacitances; and
   charge control switches connected between said junction points of said snubber capacitances which are not connected to said output and said junction point formed between each adjacent pair of said converter levels.

2. The muitipoint converter according to claim 1, wherein said said at least one resonant inductance of said second series circuit is a single resonant inductance, and said output of said converter phase is connected via said second series circuit formed of said single resonant inductance and said plurality of independently controllable bidirectional auxiliary switches to said voltage neutral points of said converter levels.

3. The multipoint converter according to claim 2, including a further independently controllable bidirectional auxiliary switch connected between said single resonant inductance and said junction point formed between said converter levels.

4. The multipoint converter according to claim 1, wherein said second series circuit is one of a plurality of series circuits each formed of said resonant inductance and an independently controllable bidirectional auxiliary switch, said output of said converter phase is connected to said voltage neutral points of said converter levels via separate ones of said plurality of series circuits.

5. A multipoint converter, comprising:
  at least four main switches per converter phase disposed in series defining a series circuit, said main switches to be connected electrically in parallel between DC voltage rails formed of a positive DC voltage rail and a negative DC voltage rail;
  snubber capacitances, one of said snubber capacitances disposed in parallel with each of said main switches and said snubber capacitances defining junction points between adjacent pairs of said snubber capacitances;
  at least two converter levels having voltage neutral points disposed between the DC voltage rails, a junction point formed between adjacent pairs of said converter levels and said voltage neutral points of said converter levels being accessible;
  an output of said converter phase connected to one of said junction points of said snubber capacitances;
  further series circuits each formed of a resonant inductance and independently controllable bidirectional auxiliary switches, said junction points of said snubber capacitances which are not connected to said output are connected to said voltage neutral points of said converter levels via said further series circuits; and
  charge control switches connected between said junction points of said snubber capacitances which are not connected to said output of said converter phase and said junction point formed between adjacent pairs of said converter levels.

6. The multipoint converter according to claim 5, including another series circuit formed of a resonant inductance and an independently controllable bidirectional auxiliary switch, said another series circuit connected between said output of said converter phase and said junction point formed between said converter levels.

* * * * *